(12) United States Patent
Van Biesen

(10) Patent No.: US 10,133,059 B2
(45) Date of Patent: Nov. 20, 2018

(54) APPARATUS AND METHOD FOR POSITIONING AN OPTICAL ELEMENT

(71) Applicant: Newson NV, Dendermonde (BE)

(72) Inventor: Marc Van Biesen, Dendermonde (BE)

(73) Assignee: Newson NV, Dendermonde (BE)

( * ) Notice: Subject to any disclaimer, the term of this patent is extended or adjusted under 35 U.S.C. 154(b) by 0 days.

(21) Appl. No.: 15/320,398

(22) PCT Filed: Jun. 20, 2014

(86) PCT No.: PCT/EP2014/063082
§ 371 (c)(1),
(2) Date: Dec. 20, 2016

(87) PCT Pub. No.: WO2015/192914
PCT Pub. Date: Dec. 23, 2015

(65) Prior Publication Data
US 2017/0139202 A1    May 18, 2017

(51) Int. Cl.
*G02B 26/08* (2006.01)
*G02B 7/182* (2006.01)
*G01D 5/20* (2006.01)

(52) U.S. Cl.
CPC ............ *G02B 26/08* (2013.01); *G01D 5/20* (2013.01); *G02B 7/1827* (2013.01)

(58) Field of Classification Search
CPC .... G02B 26/06; G02B 26/08; G02B 26/0816; G02B 26/0833; G02B 26/0841; G02B 26/0885; G02B 7/1827; G01D 5/20

USPC ............................................ 359/221.1–226.1
See application file for complete search history.

(56) References Cited

U.S. PATENT DOCUMENTS

| 4,157,861 A | 6/1979 | Davies |
| 6,188,502 B1 | 2/2001 | Aoki |
| 6,275,326 B1* | 8/2001 | Bhalla ................ G02B 26/0841 359/224.1 |
| 6,711,317 B2* | 3/2004 | Jin ..................... G02B 26/0841 359/838 |
| 8,665,500 B2 | 3/2014 | Osipchuk |
| 2001/0000130 A1 | 4/2001 | Aoki |
| 2003/0058550 A1 | 3/2003 | Ju |

FOREIGN PATENT DOCUMENTS

| EP | 0519470 A1 | 1/1994 |
| WO | 2009106094 A1 | 10/2001 |
| WO | 2009106094 A1 | 9/2009 |

\* cited by examiner

*Primary Examiner* — Euncha Cherry
(74) *Attorney, Agent, or Firm* — James Creighton Wray; Meera P. Narasimhan

(57) ABSTRACT

The current invention concerns an apparatus and a method for positioning an optical element, said apparatus comprising a positionable part to which the optical element can be mounted; a base part; a suspension system, said positionable part being mounted on said base part in a movable manner with said suspension system; an actuation system for actuating movement of said positionable part with respect to said base part; and a control system for controlling movement of said positionable part.

21 Claims, 5 Drawing Sheets

APPARATUS AND METHOD FOR POSITIONING AN OPTICAL ELEMENT

This application claims the benefit of PCT/EP2014/063082 filed Jun. 20, 2014, International Publication No. WO 2015/192914, and the amended sheets from the IPRP, which are hereby incorporated by reference in their entirety as if fully set forth herein.

TECHNICAL FIELD

The invention pertains to the technical field of positioning apparatus for an optical element and methods for positioning an optical element, more in particular an apparatus capable of rotating and/or shifting an optical element with respect to an optical beam axis.

BACKGROUND

Apparatus for positioning optical elements within an optical beam axis are necessary in many applications, in particular in applications concerned with laser manipulation processes such as laser scanning, laser engraving, laser marking, laser ablation or laser etching, but also other application which necessitate deflection of a light beam, whether incoherent, coherent or partially coherent, according in a controllable manner.

EP 0 579 471 A1 discloses a scanning apparatus which includes a scanning mirror having a reflective surface and an electromagnetic apparatus for deflecting the scanning mirror. A coil assembly is mounted onto the scanning mirror and a permanent magnet assembly. A capacitive sensor senses the deflection of the scanning mirror. The capacitive sensor includes a detector for sensing the change in capacitance between a conductive element fixed to the mirror and at least part of the base.

WO 01/78096 A2 discloses an actuator which comprises a planar substrate with two conductors at different potentials. A coil made as a conical helix or two interleaved conical spirals and a magnet generates repelling magnetic fluxes and a second coil creates a third flux causing the ends of the other two coils to move relative to the substrate.

U.S. Pat. No. 4,157,861 A discloses a system which comprises a reflective surface mounted on a baseplate. The baseplate is electromagnetically driven by applied signals to control its angular disposition to a degree of accuracy within fractions of a microradian. Coil springs are attached in pairs to the baseplate to define two orthogonally related axes of movement intersecting at the geometric centre of the baseplate. A pivotal support, preferably a jewel bearing, is positioned at the geometric centre of the baseplate. First and second pairs of permanent magnets extend from the baseplate at opposite equidistant points from the pivotal support to define first and second axes of movement which are also orthogonally related. Associated pairs of electrically conductive coils are disposed around the permanent magnets and spaced from them to permit relative movement.

US 2001/0000130 A1 discloses an oscillation drive unit which consists of an actuator to add power in certain direction for making an antenna to oscillate at a distance from the support portion of an elastic support mechanism. The mechanism supports the antenna at a central point and is attached in a frame so that oscillation can be made biaxially.

US 2003/0058550 A1 discloses a lens holder having a lens, disposed on an upper portion of a suspended yoke plate. Coil printed circuit boards (PCBs) having coils patterned for focusing, tracking and radial tilt driving of the lens holder, are attached on front and rear portions of the lens holder. Magnets positioned at predetermined intervals from the coil PCBs, drive the lens by interaction with the coil PCBs.

WO 2009/106094 A1 discloses a device for positioning an optical element in 1, 2 or 3 dimensions comprising elevation and two-dimensional tilting. Said device comprises a positionable plate whereon said optical element is or can be mounted. Said positionable plate comprises a number of electrical conductive coils serving as actuation elements positioned around the geometrical centre of said positionable plate. A base plate comprising permanent magnets forming electromotive pairs with said coils is supporting said positionable plate by means of a bearing system. When current is driven through said coils over electrical conductive mechanically flexible connections, electromotive forces, all substantially normal to said positionable plate, are formed at said coil positions. Said forces can be compiled in a two-dimensional tilt torque and an elevation force capable, by means of said bearing system, to tilt in two dimensions and/or elevate the positionable plate relative to the base plate. Regulators, comprising error signals derived from a deviation between instantaneous and desired position of said positionable plate relative to said base plate, are used to control said currents.

An apparatus for positioning an optical element typically comprises a positionable part which is mounted to a static base part in a moveable manner by a suspension system, whereby the position of the positionable part with respect to the base part can be changed by means of an actuation system.

These and other prior art devices and methods give rise to some problem, including, but not limited to, the following.

The speed of positioning and repositioning of the optical element could be severely limited in the prior art due to the weight of the positionable part of prior art devices, which can be a consequence of the actuation system of the apparatus, which may necessitate the presence of a heavy iron core on the positionable part for e.g. increasing inductive reactance; furthermore, inductive actuation may lead to considerable energy losses, especially at high positioning speeds, which could necessitate cooling systems.

Another problem with prior art devices and methods is the size of the apparatus and in particular its actuation or suspension system, which can be too large for certain applications or to be implemented into e.g. a table-top or small-scale set-up.

A further problem of prior art devices and methods is that the positionable part is usually moveable around a single axis, or, the positionable part consists of a number of sub-devices, mostly two, each of which are moveable around a single axis and which, when combined, lead to a positionable part which can be rotated around two independent axes. Such a setup is typically used for mirroring optical elements which are thereby capable of deflecting an optical beam to any desired direction within a maximal range. However, such a setup typically requires two or more independent actuation systems, typically one actuation system for each sub-device, which increases the size and mass of the sub-devices, which in turn leads to a reduction of speed (due to e.g. increase of the mass and inertial moments of the sub-devices), a reduction of deflection range or a reduction of maximal beam width (due to e.g. connectivity or wiring difficulties, or e.g. in case of a mirroring optical element which consists of two mirrors, rotatable around perpendicular axis, where the first mirror in the optical path can be kept small, but the second mirror needs to be larger, depending on the maximal deflection angle of the first mirror).

Yet a further issue in prior art devices and methods is the lack of a possible shifting movement of the positionable part. Such a shifting movement refers to a change in position of the positionable part, generally along the optical beam axis. A shifting movement can be used in case a change of optical beam length is required or can be useful. Such can be the case in optical systems comprising e.g. a lens, lensing system, diffraction system, interference system or 3D printing/engravement system.

Another problem arising in prior art devices and methods relates to controlling the movement and/or measuring the position of the positionable part. In order to have optimal control over the movement, a feedback control mechanism based on a measurement of the position of the positionable part can be implemented. Hereby, the position of the positionable part can be made to follow a, preferably predetermined, target position by measuring the actual position of the positionable part and actuating the movement of the positionable part to minimize the difference between actual position and target position (e.g. by a PID controlling method). Such a method, however, necessitates the presence of a position measurement or sensing system, which is preferably as fast and accurate as possible in order to allow large operational speeds, while keeping costs and safety risks as low as possible.

The present invention aims to resolve at least some of the problems mentioned above.

The invention thereto aims to provide an apparatus for positioning an optical element which can be kept small in size, which comprises an efficient actuation system requiring a very small amount of energy for its operation and hence does not necessitate cooling, which allows movement of the optical element around one or more axes and/or along a longitudinal direction, whereby the position and movement of the positionable part and of the optical element mounted thereon can be controlled fast, safe, cheap and accurately.

SUMMARY OF THE INVENTION

The present invention provides an apparatus for positioning an optical element comprising a positionable part to which the optical element can be mounted, a base part, a suspension system connecting said positionable part to said base part in a movable manner, an actuation system for actuating movement of said positionable part with respect to said base part, and optionally a control system for controlling movement of said positionable part. In an embodiment, the suspension system comprises at least one suspension element, preferably at least three or exactly three suspension elements, more preferably mechanical suspension elements, whereby preferably at least one suspension element and more preferably each suspension element, comprises a spring, such as a leaf spring, preferably a metal leaf spring. Each suspension element is attached to said base part at at least one base suspension location, thereby defining a base reference system, preferably a base reference plane. Each suspension element is also attached to said positionable part at at least one positionable suspension location, thereby defining a positionable reference system, preferably a positionable reference plane. The present suspension system allows fast and accurate movement of an optical element mounted on the positionable part, and thereby fast and accurate manipulation of a light beam reflected by or transmitted through such an optical element. An embodiment of the present invention comprising at least three or exactly three suspension elements attached to the positionable part at at least three or exactly three positionable suspension locations, is particularly preferred.

The suspension system described above allows many types of light beam manipulation, in particular three-dimensional manipulation, using only one positionable part. This greatly limits the apparatus in size and weight and allows fast and accurate deflection.

In a preferred embodiment, said suspension system comprises a number of suspension elements which is a multiple of three, such as 3, 6, 9, 12 or more, preferably whereby said suspension elements are divided in three groups of n suspension elements, n being any strictly positive integer number, such as 1, 2, 3, 4 or more.

In an embodiment, said actuation system comprises at least one actuation element, such as 1, 2, 3, 4, 5, 6, 7, 8, 9 or more actuation elements, more preferably at least three actuation elements. In a preferred embodiment the actuation system comprises one actuation element for each suspension element or for each group of suspension elements. In a preferred embodiment, the actuation system comprises a number of actuation elements which is a multiple of three, such as 3, 6, 9, 12 or more, preferably whereby said actuation elements are divided in three groups of m actuation elements, m being any strictly positive integer number such as 1, 2, 3, 4 or more, whereby preferably each group of actuation elements is arranged to cooperate.

In an embodiment, the actuation element comprises an electrical conductor, preferably en electrical conductive coil, mounted on the positionable part, and one or more magnets, preferably permanent magnets, mounted on the base part near said conductor, preferably essentially longitudinally next to said conductor, i.e. whereby a magnet comprises a magnet axis through a north pole and a south pole of said magnet, said magnet axis oriented essentially longitudinal and whereby said conductor is located near said magnet axis, preferably also near or next to said north pole or said south pole, or whereby said conductive coil is essentially located around said magnet axis. The actuation of the positionable part can be obtained by arranging an electrical current to flow through said conductor. The Lorentz force acting on a conductor in which an electrical current flows by a magnetic field or magnetic induction, can hereby be used to move the positionable part in a direction and with a speed or acceleration which depends on the direction and magnitude of the electric current in the conductor. A conductor in the shape of a coil or comprising one or more loops, placed near, e.g. below or above, said magnet increases the force which acts on the conductor in which a specific current flow is present, and therefore allows faster actuation at smaller currents. The electrical conductor or coil is preferably positioned at least partly at or near a peripheral edge of the positional plate, and the magnet is preferably located longitudinally near or next to said peripheral edge. This is particularly preferred in case the positionable part needs to be rotatable, in which case it may be beneficial to have the Lorentz force act near the peripheral edge of the positionable part for a more accurate control and/or smoother movement of the positionable part. Preferably the actuation element comprises an electrical source, e.g. a current source or voltage source, which may be common to all actuation elements, said source not being mounted on the positionable part, e.g. mounted or located on, at or near the base part. A current can be made to flow in said conductors of said actuation elements via electrical connections between said source and said conductors, which may be located on said suspension elements, or whereby said electrical connections are at least partially formed by electrically conducting parts of said suspension elements.

In a preferred embodiment, at least one and preferably each actuation element comprises p conductive coils, preferably connected in series, and q magnets, preferably permanents magnets, whereby p and q are strictly positive integer numbers, such as 1, 2, 3, 4, 5, 6, 7, 8, 9, 10 or more. More preferably, p is a multiple of q, such as p being equal to q, 2q, 3q, 4q or more. Most preferably, at least one and preferably each actuation element comprises 2 permanent magnets and 2 or 4 conductive coils positioned on said positionable part essentially longitudinally next to or near a pole of said magnets. Preferably said coils comprise 1 or more loops or windings, such 1, 2, 3, 4, 5, 6, 7, 8, 9, 10 loops or more.

In a preferred embodiment, the actuation system comprises three actuation elements, each comprising p conductive coils and/or q magnets as described here above. Therefore, preferably the actuation system comprises a total number of conductive coils which is a multiple of three, such as 3, 6, 9, 12 or more, and/or a total number of magnets which is a multiple of three, such as 3, 6, 9, 12 or more.

In a preferred embodiments, said one or more magnets comprise a north-south pole direction along an essentially longitudinal direction.

In a particularly preferred embodiment, 2 or more magnets, preferably permanent magnets, of an actuation element are disposed in an alternated pole arrangement, i.e. whereby a first magnet comprises a north pole at a proximal end, i.e. an end located near the positionable part, and a south pole at a distal end, e.g. an end located longitudinally away from the positionable part along a longitudinal direction, and whereby a second magnet, which neighbours the first magnet, comprises a south pole at the proximal end and a north pole at the distal end. Such an alternating-pole arrangement ensures that the combined magnetic field of the magnets is increased nearby the proximal ends, and thus nearby the positionable part, while the combined magnetic far-field, i.e. at long distances, is limited. This leads to a reduction of energy during operation as the high field values near the positionable part require smaller currents through the conductors of the actuating elements on the positionable part, and also leads to increased safety as the far-field is negligible and allows e.g. paramagnetic or diamagnetic material to be used relatively nearby the apparatus.

In an embodiment, said apparatus comprises a control system for controlling movement of said positionable part. Said control system hereby preferably comprises means for controlling the electrical current flowing through an electrical conductor of an actuation element, preferably controlling the electrical current flowing through each of said electrical conductors of said actuation elements. Said control system also preferably comprises a sensing system for measuring the position of the positionable part, preferably the sensing system comprising at least three sensing elements, which allow measurement of the full 3D position of the positionable part. In a particularly preferred embodiment, said control system comprises one or more regulating systems, preferably comprising a feedback mechanism, e.g. a proportionate (P), an integrating (I) or a derivating (D) regulating system, or any combination thereof, in particular one or more PID regulating mechanisms, which allows steering of the movement by e.g. steering the electrical currents through said electrical conductors of said actuation elements, said movement following a target movement or a set of target positions for said positionable part, taking into account the actual position of said positionable part as measured by the sensing system.

In a particularly preferred embodiment, at least one sensing element of said sensing system comprises a high-frequency electrical signal generator which is arranged to make a high-frequency current component flow through an electrical conductor, preferably an electrical coil, on said positionable part, said electrical conductor preferably being an electrical conductor of an actuation element, and said sensing element comprising an induction-based proximity or distance sensor, preferably located on the base part, more preferably longitudinally near or next to said conductors on the positionable part. Hereby the proximity sensor preferably comprises a static coil, which is capable of picking up the energy, in the form of an induced current, at high-frequency from the electrical conductor via magnetic induction, the magnitude of which depends on the distance between the electrical conductor on the positionable part and the proximity sensor or its static coil. Preferably said static coil is mounted near or on top of a magnet, preferably the permanent magnet, of an actuation element. Preferably a proximity sensor is provided on each or on at least three of said magnets of said actuation elements.

In a second aspect, the present invention provides a method for positioning an optical element, said method comprising the steps of:

providing an apparatus for positioning an optical element, preferably comprising a positionable part to which the optical element can be mounted, a base part, a suspension system connecting said positionable part to said base part in a movable manner, an actuation system for actuating movement of said positionable part with respect to said base part, and optionally a control system for controlling movement of said positionable part, said optical element being mounted on said positionable part;

actuating movement of said positionable part for positioning said optical element.

Preferably, said apparatus is an apparatus according to the present invention.

In a preferred embodiment, said movement of said positionable part comprises rotation around one axis or two at least partially independent axes and/or translation or shifting along a longitudinal direction, preferably wherein said one or two axes comprise a component perpendicular to said longitudinal direction, i.e. whereby the one or two axes are essentially not parallel to the longitudinal direction. In a preferred embodiment, at least one axis is oriented essentially perpendicular to said longitudinal direction. In this manner, movement of the optical element in three dimensions can be obtained. In a preferred embodiment, said rotation around said one axis and/or said two axes, comprises a rotation over an angle of up to at least 1°, more preferably at least 5°, still more preferably at least 10°, yet more preferably at least 15°, e.g. 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, 90° or any value there between or higher.

In a further aspect, the present invention provides a method for manipulating a beam of light, e.g. a laserbeam, by an optical element mounted on an apparatus for positioning an optical element, preferably an apparatus according to the present invention. This method preferably comprises the steps of:

shifting the optical element along a longitudinal direction, thereby preferably changing a path length of the beam, preferably the optical path length. In a preferred embodiment, said optical element comprises a lens, a mirror and/or a mirroring lens or a grouping ensemble thereof, whereby said shifting results in a change of a focal point or focal plane of said beam. Alternatively or additionally said shifting is performed in combination with a deflection of said beam by a telecentric lens before or after changing the optical path length of the beam; and/or rotating the optical element around one axis comprising a component perpendicular to an optical path of said beam. Such movement can be used for deflection of the light beam over an angle in a plane if the optical element is a lens, or can be used for radial movement of the beam if the optical element is an optical flat in transmission mode; and/or subsequently or simultaneously rotating the optical element around two independent axes, each comprising a component perpendicular to an optical path of said beam. Such movement can be used for deflecting a beam from an incoming direction to any outgoing direction, e.g. if the optical element comprises a mirroring surface; and/or subsequently or simultaneously shifting the optical element along a longitudinal direction and rotating the optical element around one axis or around two independent axes; Such movement allows a control over both direction of outgoing beams as optical path lengths of the beams.

Manipulation of a light beam may comprise, but is not limited to, deflecting, mirroring, bending, focussing, defocussing, changing the path length, changing the optical path length, or any combination thereof, of the light beam.

The present invention also concerns a positionable part and/or a base part suitable for, and preferably arranged for, an apparatus for positioning an optical element as disclosed in the present document.

DETAILED DESCRIPTION OF THE INVENTION

Figure 1:
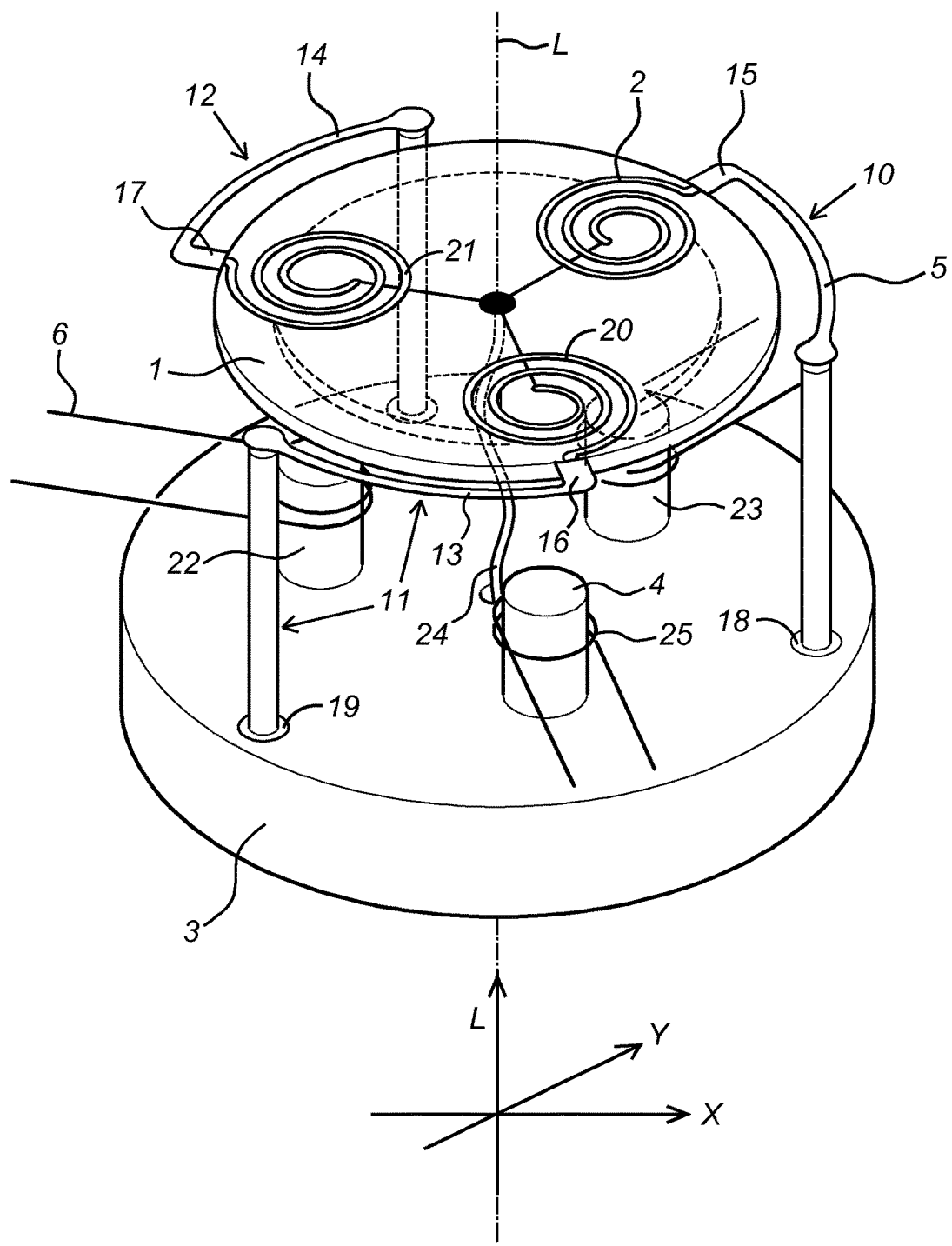
FIG. 1 illustrates an apparatus according to the present invention, comprising three suspension and three actuation elements, each comprising one permanent magnet and one moving coil.

The present invention concerns an apparatus for positioning an optical element comprising a positionable part to which the optical element can be mounted, a base part, a suspension system connecting said positionable part to said base part in a movable manner, an actuation system for actuating movement of said positionable part with respect to said base part, and optionally a control system for controlling movement of said positionable part as disclosed in the claims and here above. The present invention also concerns a method for positioning an optical element and methods for deflecting a beam of light as disclosed here above and in the claims. Preferred embodiments of the apparatus and methods of the present invention are further described below.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "% by weight" (weight percent), here and throughout the description unless otherwise defined, refers to the relative weight of the respective component based on the overall weight of the formulation.

The terms "axial direction" or "longitudinal direction" as used herein and throughout the description unless otherwise defined, refers primarily to the principal direction of the light which is to be directed or manipulated by the optical element which can be mounted on the present device. In case the light is to be deflected over a large angle, e.g. in the case the optical element is a mirror positioned at an angle of about 45° with the light beam, the longitudinal direction refers to the average direction of the light before and after the deflection. In the case an optical element which is mounted on the positionable part comprises an axial direction, e.g. in the case of a lens or a mirror where the axial direction is perpendicular to the surface in a geometric centre of said surface, the axial direction can also be defined as being essentially parallel to the axial direction of the optical element. In an embodiment whereby the positionable part is suspended by at least three suspension systems at three positionable suspension locations, said positionable suspension locations define a positionable reference plane which is preferably arranged essentially perpendicular to the axial direction when the positionable part is in a resting position, i.e. no actuation is applied to the positionable part. Hereby, the axial direction can be defined by the direction perpendicular to said positionable reference plane. Analogously, the axial direction can also be defined by the direction perpendicular to the base reference plane of the base part. In most embodiments, at least some or all of the above definitions essentially coincide.

The terms "resting position", "zero deflection position" or "zero deflection position plane" refer to the position or position reference plane of the positionable part in a non-actuated state, i.e. the state whereby no actuation by the actuation system is present. In particular it refers to the position of the positionable plane with respect to the base plane if e.g. no electrical current flows through conductors of the actuation elements on the positionable plane. Preferably, any terms relating to the position of the positionable plane or any components mounted thereon when described in comparison to the base part or any components thereon, which are used to describe the apparatus in a non-working condition, are to be interpreted as when the positionable plane is in the zero deflection position, e.g. if a magnet of an actuation element, mounted on the base part, is described to be longitudinally near an electrical conductor on the positionable part, this refers to the relative positions of magnet and conductor in the zero deflection position of the positionable part.

The terms "proximity sensor" or "distance sensor" as used herein and throughout this document are synonymous and refer to sensors or measurement devices which measure distances either directly or indirectly by measurement of a distance-dependent parameter. In the latter case, said distance sensors could preferably be implemented with a converting means for converting a value of said distance-dependent parameter into a value for the distance or vice versa. Such a conversion means could comprise an algorithm, e.g. as implemented on a processing unit.

In an embodiment, the positionable part comprises or is a positionable plate, and/or preferably comprises a circuit board, preferably a printed circuit board (pcb) or a rigid material, e.g. a reinforced material such as a fiber reinforced material, e.g. reinforced with glass and/or carbon fibers, onto which other components can be mounted, such as electrical conductors. In a preferred embodiment, said conductors comprise metal conductors, preferably cupper or aluminum conductors.

In an embodiment, the base part comprises a base plate, and/or preferably comprises a circuit board, preferably a printed circuit board, onto which preferably said static coils of said distance sensors are disposed.

In a preferred embodiment, two, three or more of said suspension elements are at least partially independent from each other, thereby allowing at least partially independent movement of one or more of said positionable suspension locations, preferably along a longitudinal or axial direction. Such at least partially independent suspension elements allow movement of the positionable part in a very controllable manner.

Preferably said positionable suspension locations of at least three suspension elements are arranged in a positionable reference plane which constitutes a reference plane for the orientation of the positionable part, i.e. the position of the positionable reference plane is in a one-to-one correspondence with the position of the positionable part. Preferably said base suspension locations of at least three suspension elements are arranged in a base reference plane which constitutes a reference plane for the orientation of the base part, i.e. the position of the base reference plane is in a one-to-one correspondence with the position of the base part.

Preferably said positionable and/or base suspension locations and/or said suspension elements are arranged in an essentially regular polygonic set-up, e.g. a regular triangle, a square, or a regular quintagon, sexagon, heptagon, octagon, nonagon.

In a preferred embodiment, said suspension element comprises an electrically conducting part which forms part of said conductor of said actuation element, preferably an actuation element corresponding to said suspension element. In a particularly preferred embodiment, said suspension element comprises a metallic leaf spring which forms part of the conductor. In another preferred embodiment, said suspension element is a mechanical suspension element which is provided with at least one electrical pathway, e.g. a metallic strip or wire, e.g. a cupper or iron strip or wire.

In a preferred embodiment, said suspension elements comprise flexible arms, which preferably are hybrid flexible arms, i.e. flexible arms constructed from electrically insulating foil material. Different electrical conducting tracks routed on this material can be used to integrate several electrical connections on a single suspension element or a single flexible arm.

In a preferred embodiment, said apparatus comprises three actuation elements, each comprising an electrical conductor, such as a coil, whereby said electrical conductors are electrically connected to the base part via a bridging conductor between said positionable part and said base part, preferably said bridging conductor being provided at or near a geometric centre of said positionable part. Such a bridging conductor can act as a common drain for the three electrical conductors, each electrical conductor also being separately electrically connected e.g. via the suspension element, preferably via a metallic leaf spring of said suspension element, to a current source. In a setup with three metallic leaf spring suspensions which act as electrical connections between a source which is not located on the positionable part, e.g. located on the base part, and the electrical conductors and/or coils on the positionable part, which conductors being further connected via the common bridging conductor to the source. This allows three independently steerable electrical currents to flow the three conductors of the three actuation elements, with a minimum of electrical connections between positionable part and base part. Three independently steerable or controllable currents can be used to control movement of the positionable part in three dimensions, e.g. movement around two independent rotation axes and movement along the longitudinal direction or a shifting movement.

Preferably, the bridging connector is flexible, bendable and/or extensible, and/or comprises a flexible conducting wire.

In a preferred embodiment, said high-frequency electrical signal generator is capable to, preferably arranged to, generate signals at a signal frequency which is higher than 10 kHz, preferably higher than 50 kHz, more preferably higher than 100 kHz, still more preferably higher than 200 kHZ, yet more preferably higher than 300 kHz, even more preferably higher than 400 kHz, yet even more preferably higher than 500 kHz. In a preferred embodiment, said signal frequency is higher than all mechanical and/or electrical resonant frequencies of said positionable part.

In a particularly preferred embodiment, said high-frequency electrical signal generator is integrated in the apparatus, preferably disposed on the base part. This leads to a more compact apparatus and an easier shielding of any possible high-frequency electromagnetic fields which could emerge from the signal generator.

In a preferred embodiment, said high-frequency electrical signal generator comprises a class D amplifier and/or said controlling system comprises one or more regulating systems which comprise a class D amplifier. Class D amplifier are cheap and inherently produce high-frequency signals which in prior art apparatus were filtered or dampened for safety reasons, i.e. to eliminate propagation of high-frequency electromagnetic fields to the environment. However, in the present apparatus, the high-frequency signals can be contained within an apparatus enclosure, due to the limited size of the present apparatus, i.e. as the apparatus of the present invention can be kept relatively small, in particular much smaller than prior art apparatus, it is easier to screen off the high-frequency components by encapsulation the complete apparatus, including a high-frequency electrical signal generator of its controlling or regulating systems.

In a preferred embodiment, said control system comprises an algorithm to convert a target position of the positionable part to target distances for said proximity sensors.

In a preferred embodiment, said positionable part comprises an optical aperture, preferably at, near and/or around a geometrical centre of the positionable part. This allows for operation of the apparatus in transmission mode, wherein a light beam can be deflected by a transmission optical element, such as a lens or a flat or curved transparent plate, mounted on the positionable part.

In a preferred embodiment, an optical element is mounted on said positionable part, said optical element preferably comprising any or any combination of the following: an aperture, a mirror, a lens, a mirroring lens, an optical flat, a transparent optical flat, a group of lenses, a divergent lens, a convergent lens, a diffraction lens, a diffraction grating, a set of apertures, a prism.

EXAMPLE

FIGS. 1-4 illustrate two embodiments of an apparatus according to the present invention. The apparatus comprises a positionable part (1), i.c. a positionable plate, to which an optical element, e.g. a mirror or lens, can be mounted. The positionable part can move with respect to a base part (3) which thus acts as a stator of the apparatus, as the positionable part is suspended by three suspension elements (10, 11, 12), each comprising a metallic leaf spring (5, 13, 14) which result in a flexible mechanical connection. The suspension elements are connected to the positionable part at position suspension points (15, 16, 17) and to the base part at base suspension points (18, 19, 26). The leaf springs are fitted to provide maximal rigidity in radial direction and maximal flexibility in axial direction (L) of the positionable part.

The actuation system of the apparatus of FIG. 1 comprises three actuation elements, each of which comprises an electrically conducting coil (2, 20, 21), also termed moving coil, mounted on the positionable part and a permanent magnet (23, 4, 22) mounted on the base part longitudinally (L) underneath the coils (2, 20, 21). Note that the actuation elements and suspension elements are arranged in a regular triangular setup around a longitudinal axis (L). Electrical current coming from an electrical source on or near the base part can be made to flow through the coils (2, 20, 21) via the metallic leaf springs (5, 13, 14) and via a bridging conductor (24) which acts as a common conductor, e.g. a common ground, for the three coils. If a current flows through any of said coils (2, 20, 21), a Lorentz force on the coils and thus on the positionable part results due to the magnetic field of the permanent magnets (23, 4, 23). Note that this force acts on the positionable part substantially along the longitudinal direction. Due to the setup of the suspension elements, current flowing through one coil will effectively result in a combined rotation and shifting movement of the positionable part. By well controlling the three independent currents flowing through the three coils, a full rotation around rotation or tilting axes (X, Y) and/or a shifting movement along the longitudinal axis (L) can be obtained.

A static coil (27, 25, 6) is mounted on each permanent magnet (23, 4, 22). These static coils form part of the sensing system for measuring the position of the positionable part. Hereby, the magnetic or inductive coupling between said static coils and the coils (2, 20, 21) of the actuation elements is used to form 3 distance sensors. A number of regulating systems, equal to said amount of distance sensors, i.c. three, are part of a control system which controls the movement or position of the positionable part by controlling the currents through the three coils (2, 20, 21) via said regulating systems. Preferably the regulating systems comprise PID feedback mechanisms, each of which drives one independent current through a coil (2, 20, 21) in order to make the positionable plate follow a target position, depending on the actual position as measured by the distance sensors.

Figure 2:
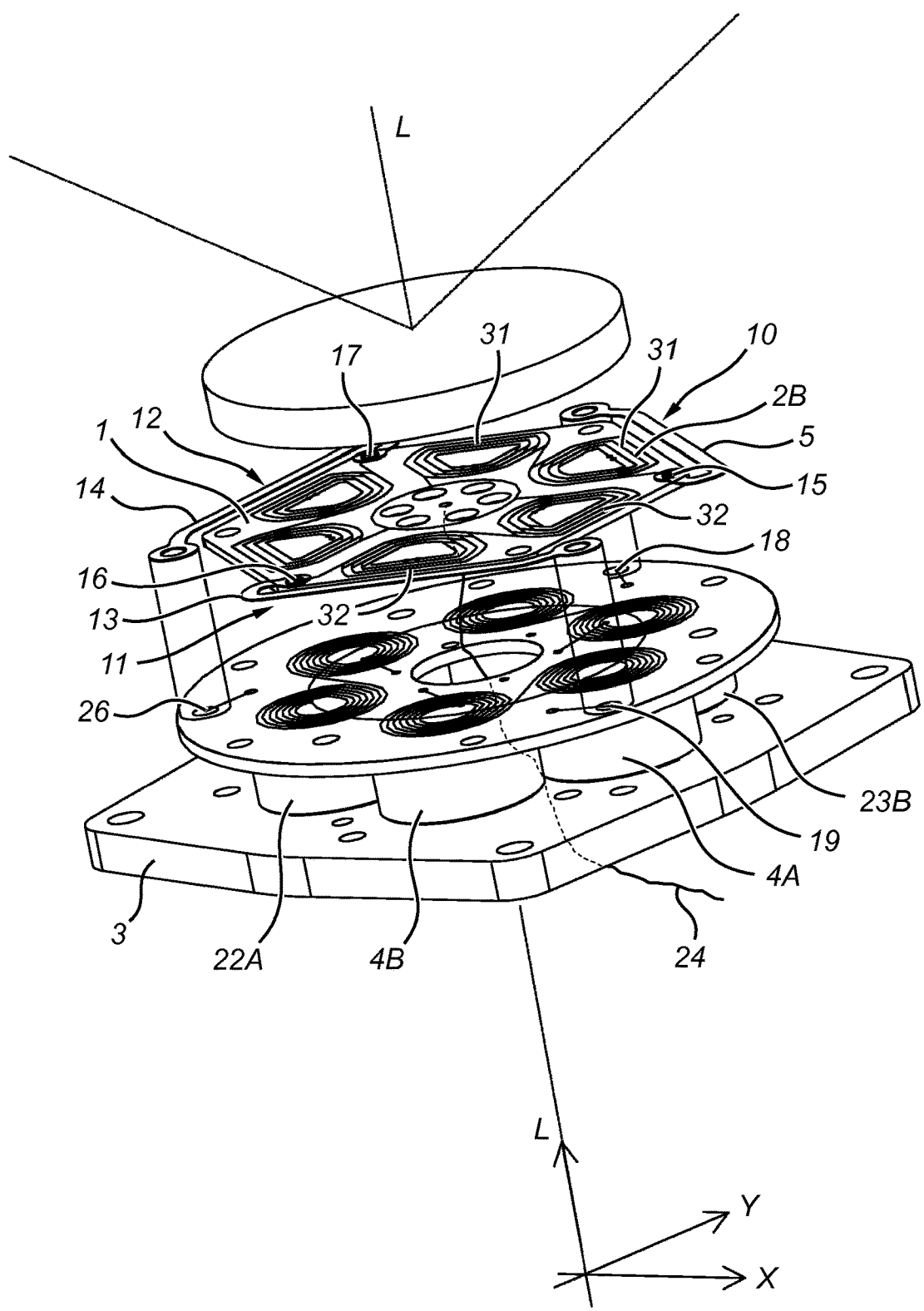
FIG. 2 illustrates an embodiment of an apparatus according to the present invention, wherein the optical element, the positionable part and the base part are slightly pulled apart for illustrative purposes.
Figure 3:
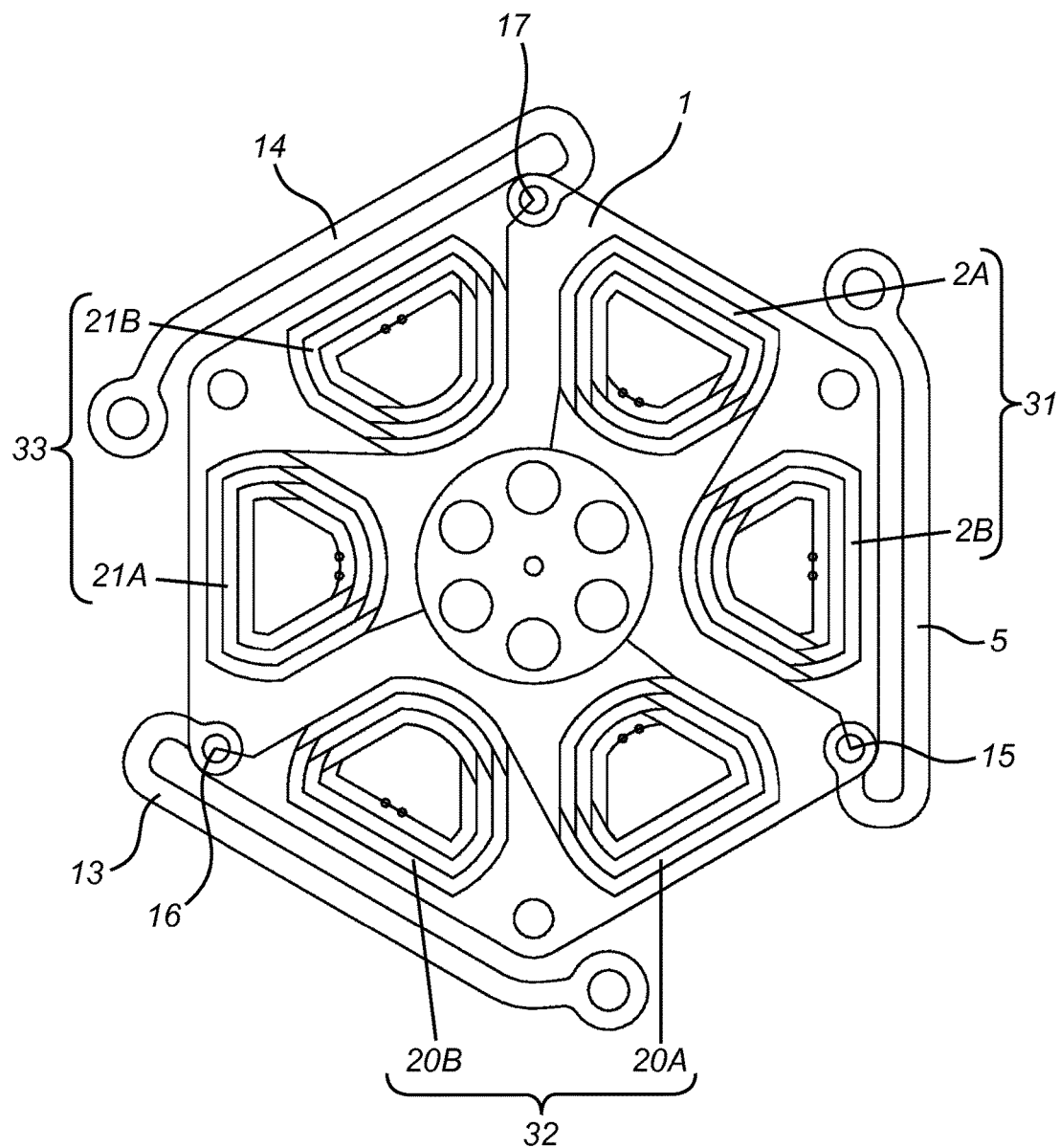
FIGS. 3 and 4 show a top view of the positionable part and the base part of this embodiment respectively.
Figure 4:
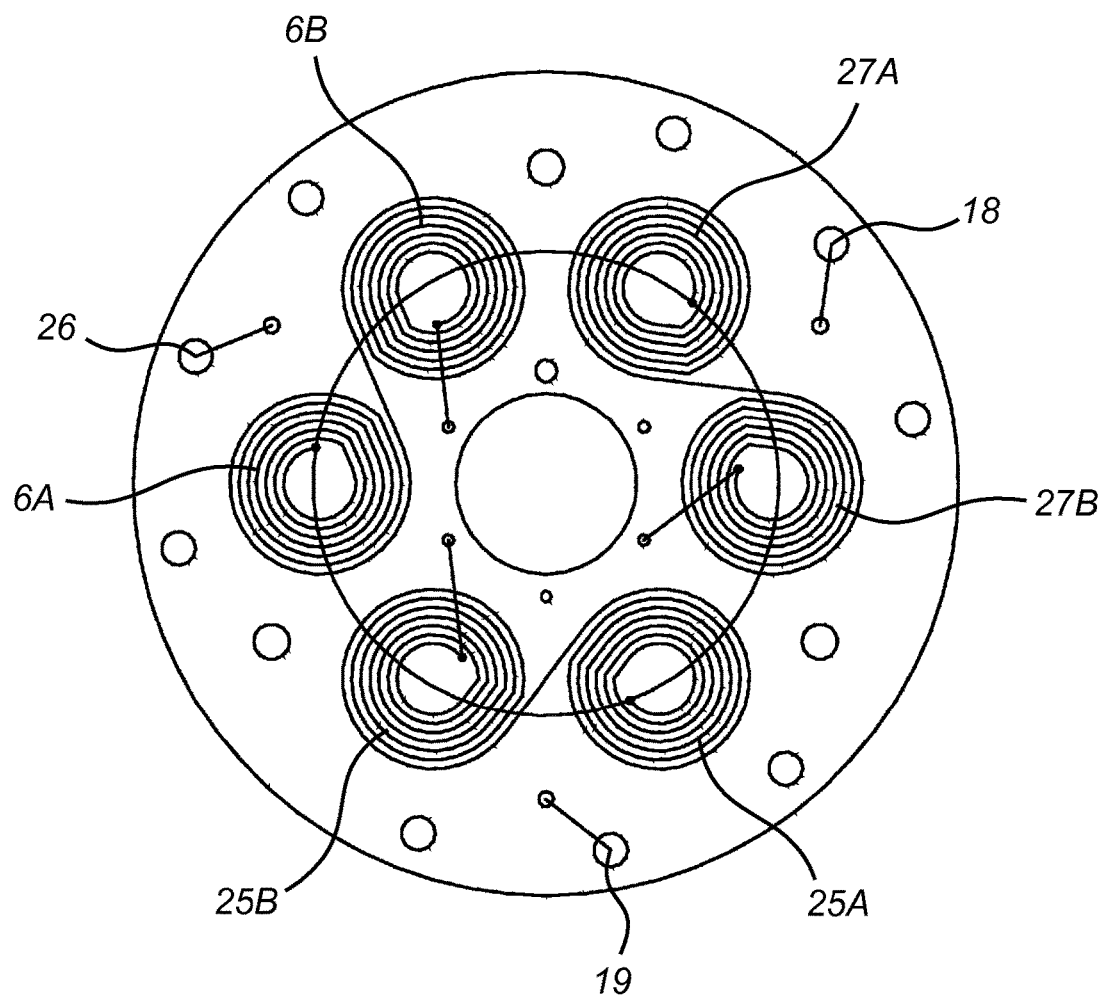

FIG. 2 illustrates an embodiment of an apparatus according to the present invention, wherein the optical element, the positionable part and the base part are slightly pulled apart for illustrative purposes. FIGS. 3 and 4 show a top view of the positionable part and the base part of this embodiment respectively. Elements of this embodiment which correspond with elements from the embodiment of FIG. 1 are referenced by the same numbers.

Herein, the positionable part (1) comprises a printed circuit board, provided with three groups of moving coils (31, 32, 33), each group comprising two coils on the top side of the pcb and two coils on the bottom side of the pcb. This is best show in FIG. 3, where three groups of coils (31, 32, 33) each comprise two sets of coils (2A and 2B for group (31), 20A and 20B for group (32) and 21A and 21B for group (33)), the two sets of each group being connected in series. Hereby each set (2A, 2B, 20A, 20B, 21A, 21B) of coils actually comprises two coils, one on the top side of the pcb, and one on the bottom side of the pcb (both are shown on FIG. 3), which are connected in series with a via through the pcb. Such an arrangement increases the total number of windings of the coils, which in turn leads to a reduction of the current required to flow through the coils for actuation of the movement, which increases energy efficiency.

The embodiment of FIGS. 2-4 differ from the embodiment of FIG. 1 mainly in the number of moving coils: 12 coils, arranged in 3 groups (31, 32, 33) of 4 coils as described here above; and in the number of magnets: 6 magnets, arranged in 3 groups of 2 magnets (e.g. magnets (4A, 4B) form one group of magnets of one actuation element, while magnet (22A) is one magnet of another group of two magnets of a second actuation element—the other magnet of this group is not shown on the figure, and while magnet (23B) is one magnet of the third group of two magnets of a third actuation element—the other magnet of this group again not shown in the figure). The magnets (23B, 4A, 4B, 22A, and the two not-shown magnets) are arranged in an alternating-pole setup, e.g. with the north pole of magnet (23B) being oriented towards the positionable plate (1), in particular near moving coil (2B), with the south pole of magnet (4A) oriented towards the positionable plate (1), with the north pole of magnet (4B) oriented towards the positionable plate (1), and with the south pole of magnet (22A) oriented towards the positionable plate (1), etc. Note that such a setup coincides with the two sets of each group of moving coils having an opposite direction of spiraling. For instance, if a current is made to flow through the group (32) of moving coils, whereby this current flows in the clockwise direction through set (20A) of coils as shown in FIG. 3, then the current will flow in the counter-clockwise direction through set (20B) of coils. As the poles of the corresponding magnets (4A) and (4B) are alternated oriented, the Lorentz force acts on the two sets (20A, 20B) of coils in essentially the same direction.

The base part (3) comprises a pcb, as shown from the top in FIG. 4, provided with three groups of static coils (27A and 27B, 25A and 25B, 6A and 6B), for determining the position of the positionable part. Note that the static coils can be disposed in between the magnets and the sets of moving coils, e.g. static coil (25A) is disposed between magnet (4A) and moving coil (20A). The static coils of each group are connected in series in an opposite direction of spiraling in order to increase the sensitivity for the high-frequency signal which can be emitted by the moving coils when a high-frequency current is made to flow through these moving coils.

The target position of the optical element, e.g. the mirror, is generated by the control system. The position may comprise a first tilting angle x around a first tilting axis (X), a second tilting angle γ around a second tilting axis (Y) and/or an elevation. The target angles and elevation are converted to target distances for the moving coil/magnet pairs. Those target distances and the measured distances are used by the regulating systems to control the currents through the moving coils. Additional high-frequency (>500 kHz) electrical current signals are added to said currents. These high-frequency components will be used for position sensing.

Therefore, the electrical current through each moving coil comprises of two parts:
- a low frequency part to control the applied mechanical forces on the positionable part. This part is controlled by the regulating system as it tries to equalize setpoint (target point) and actual value of the distances;
- a high frequency part that generates a fluctuating magnetic field through the moving coil. This high frequency field is picked up by the static coil paired with the moving coil—much like in a transformer. The smaller the distance between moving coil and static coil, the more energy of the signal emitted by the moving coil is picked up by the static coil. This principle is then used for measuring the distance between the static coil and the moving coil. The frequency of this signal is high enough so that resulting mechanical forces have a negligible effect on the actual position of the positionable part.

The regulating systems can be fitted with class D amplifiers. The inherent high frequency components of a class D output stage can be used as a source for the high frequency part of the moving coil current. Infusion into the moving coil of a separate high frequency electrical generator can be an alternative source for the high frequency components.

In a typical laserbeam deflection system, the angle x and angle γ are used to steer the beam towards a specific position in a working area.

Figure 5:
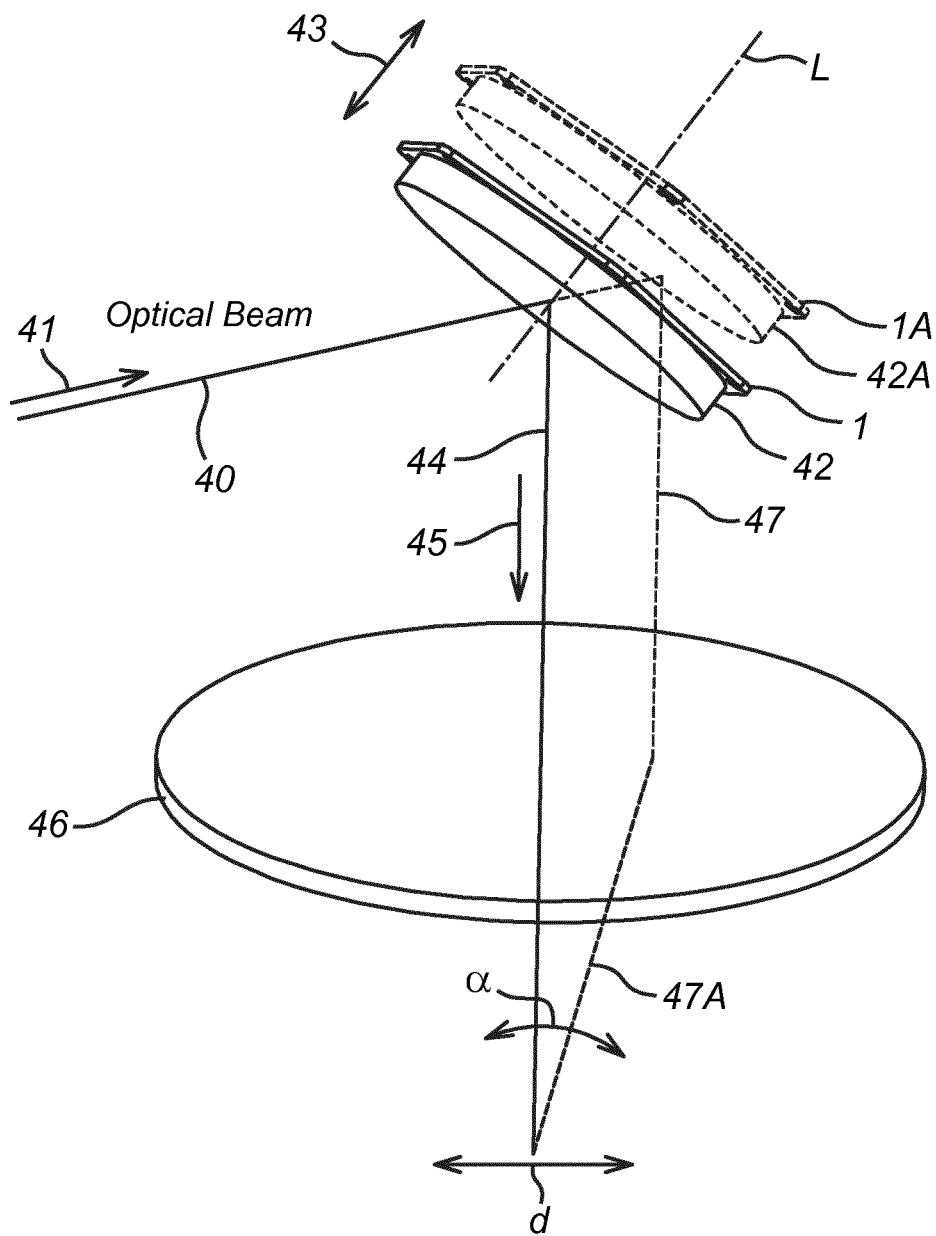
FIG. 5 illustrates a setup wherein an apparatus according to the present invention allows to control the angle of incidence of a light beam.

In combination with a telecentric focusing lens, the elevation of the optical component mounted on the positionable part, can be used to control the angle of incidence. This can be a huge advantage e.g. to control the straightness of flanks of drilled holes. FIG. 5 illustrates such a setup wherein an apparatus according to the present invention allows to control the angle of incidence of a light beam. Herein an optical beam (40) travelling along an initial direction (41), is reflected by a mirror (42) mounted on the positionable part (1) of an apparatus according to the present invention, resulting in an outgoing light beam (44) following a first final direction (45). Note that the longitudinal direction (L) is hereby the direction perpendicular to the mirroring surface. The outgoing light beam (44) traverses through the optical center of a telecentric lens (46), and therefore is not deflected. By shifting the mirror (42) along the longitudinal direction (L) by a distance (43), such that the positionable part is in a shifted position (1A) and the mirror is in a shifted position (42A), the optical beam (40) is reflected by the shifted mirror (42A), resulting in a shifted outgoing light beam (47) following a direction which is essentially parallel to the first final direction (45). However, the shifted outgoing light beam (47) does not traverse through the optical center of the lens (46), and hence is deflected (47A) over an angle, resulting in a change of angle of incidence a with respect to the undeflected light beam (44). The exact value of a can be controlled by the value of the shift distance (43) of the mirror and positionable part. Note that the shift of the mirror can be combined with a rotation around one axis or two axes, resulting in a large range of possible angles of incidence as well as a large range of possible transversal shifts (d) of the resulting beam after traversing the lens (46).

In a preferred embodiment, the positionable part and/or base part comprises an aperture, e.g. an optical aperture, which allows manipulation of a light beam in transmission mode, i.e. whereby a beam of light falls onto one side of an optical element, passes through the optical element and leaves at another side of the optical element. This can be obtained by a positionable and/or base part comprising holes in or near their respective geometric centres, which allow a light beam to pass through the apparatus. In such an apparatus, the optical element is preferably a lens or an optical flat or a prism.

The apparatus can be used to move an optical aperture using a mirror mounted on the apparatus. This mirror can then be tilted and/or elevated.

The apparatus can be used to move a focal plane using a lens or a group of lenses mounted on the apparatus. Such lens or group of lenses can be elevated.

The apparatus can be used for radially moving an optical aperture using an optical flat mounted on said apparatus. Said flat can be tilted and/or elevated.

It is supposed that the present invention is not restricted to any form of realization described previously and that some modifications can be added to the presented example of fabrication without reappraisal of the appended claims. For example, the present invention has been described referring to an apparatus capable of positioning an optical element in three dimensions by rotation around two independent tilting axes and shifting along a longitudinal direction, but it is clear that the invention can refer to an apparatus which only requires shifting movement for instance or only a rotational movement. In particular, when only a shifting movement is required the number of suspension elements, and preferably the number of leaf springs can be more than three, e.g. 4, 5, 6, 7, 8, 9, 10 or more. Further, such an embodiment could comprises exactly one actuation element comprising one electrical conductor or coil on the positionable part and one magnet, preferably a permanent magnet, on the base part.

In further embodiments, an actuation element can be replaced by a set of actuation elements, e.g. a pair of actuation elements, working in parallel or in series, preferably controlled via one regulating system.

The invention claimed is:
1. An apparatus for positioning an optical element comprising
   a positionable part to which the optical element is mountable;
   a base part;
   a suspension system, said positionable part being mounted on said base part in a movable manner with said suspension system; and
   an actuation system for actuating movement of said positionable part with respect to said base part,
   a control system for controlling movement of said positionable part,
wherein said actuation system comprises at least one actuation element and said at least one actuation element comprises an electrical conductor being electrically conductive coils, mounted on said positionable part, and one or more magnets being permanent magnets mounted on said base part near said conductor, for actuation of said positionable part by arranging an electrical current to flow through said electrically conductive coils to allow a Lorentz force acting on said electrically conductive coils to move said positionable part,
wherein said control system comprises a sensing system for measuring the position of the positionable part, said sensing system comprising at least one sensing element comprising a high-frequency electrical signal generator which is arranged to make a high-frequency current component flow through at least one of said electrically conductive coils, and said at least one sensing element comprising an induction-based proximity or distance sensor located on said base part longitudinally next to one of said at least one electrically conductive coil through which the high-frequency current component flows for picking up energy at high-frequency from said at least one electrically conductive coil via magnetic induction.

2. An apparatus according to claim 1, wherein said high-frequency signal generator is arranged to make a controlled high-frequency current component flow through the electrical conductor via electrical contact of the electrical conductor with the high-frequency signal generator.

3. An apparatus according to claim 1, wherein said high-frequency electrical signal generator comprises a class D amplifier and/or said controlling system comprises one or more regulating systems which comprise a class D amplifier.

4. An apparatus according to claim 1, wherein said high-frequency current component is generated at a signal frequency which is higher than 10 kHz.

5. An apparatus for positioning an optical element comprising
   a positionable part to which the optical element can be mounted;
   a base part;
   a suspension system, said positionable part being mounted on said base part in a movable manner with said suspension system; and
   an actuation system for actuating movement of said positionable part with respect to said base part,
   wherein said actuation system comprises at least one actuation element which comprises an electrical conductor being electrically conductive coils, mounted on the positionable part, and one or more magnets being permanent magnets, mounted on the base part near said conductor, wherein said one or more magnets are mounted essentially longitudinally next to said conductor,
   wherein said suspension system comprises at least three mechanical suspension elements, each suspension element comprising a leaf springs, wherein each of said leaf springs comprises a first end connected to said positionable part at position suspension points and a second end connected to said base part, wherein each of said electrically conductive coils and each of said position suspension points essentially lie in a common geometric plane, and wherein each of said position suspension points lies outside of a closed contour defined as enclosing each of said electrically conductive coils, wherein said closed contour extends along said common geometric plane.

6. An apparatus according to claim 5, comprising a control system for controlling movement of said positionable part.

7. An apparatus according to claim 6, wherein said control system comprises means for controlling the electrical current flowing through an electrical conductor of an actuation element, preferably controlling the electrical current flowing through each of said electrical conductors of said actuation elements.

8. An apparatus according to claim 6, wherein said control system comprises a sensing system for measuring the position of the positionable part, preferably the sensing system comprising at least three sensing elements, which allow measurement of the full 3D position of the positionable part.

9. An apparatus according to claim 8, wherein said control system comprises one or more regulating systems, comprising a feedback mechanism, which regulating systems allow steering of the movement of the positionable part, said movement following a target movement or a set of target positions for said positionable part, taking into account an actual position of said positionable part.

10. An apparatus according to claim 8, wherein at least one sensing element of said sensing system comprises a high-frequency electrical signal generator which is arranged to make a high-frequency current component flow through a moving electrical conductor, preferably an electrical coil, on said positionable part, said moving electrical conductor preferably being an electrical conductor of an actuation element, and said sensing element comprising an induction-based proximity or distance sensor, preferably located on the base part, more preferably longitudinally near or next to said conductors on the positionable part.

11. An apparatus according to claim 10, wherein said sensing element comprises one or more static coils, whereby said sensing element is configured for measuring a current running through the one or more static coils, said current being induced by the high-frequency current component.

12. An apparatus according to claim 5, wherein said actuation system comprises at least three actuation elements.

13. An apparatus according to claim 1, wherein the electrical conductor or coil is positioned at least partly at or near a peripheral edge of the positional part, and the magnet is located longitudinally near or next to said peripheral edge.

14. An apparatus according to claim 5, wherein said suspension elements comprise electrical connections between an electrical source not located on the positionable part and said electrical conductors or whereby said suspension elements comprise electrically conducting parts which form electrical connections between an electrical source not located on the positionable part and said electrical conductors.

15. A method for positioning an optical element, said method comprising the steps of:
- providing an apparatus for positioning an optical element, preferably according to claim 1; and
- actuating movement of said positionable part for positioning said optical element.

16. A method according to claim 15, wherein said movement of said positionable part comprises rotation around two independent axes and/or translation or shifting along a longitudinal direction, preferably wherein said axes comprise a component perpendicular to said longitudinal direction.

17. A method for manipulating a beam of light by an optical element mounted on an apparatus for positioning an optical element, preferably according to claim 1, comprising the steps of:
- shifting the optical element along a longitudinal direction, thereby preferably changing a path length of the beam, preferably the optical path length;
- rotating the optical element around one axis comprising a component perpendicular to an optical path of said beam;
- subsequently or simultaneously rotating the optical element around two independent axes, each comprising a component perpendicular to an optical path of said beam; or
- subsequently or simultaneously shifting the optical element along a longitudinal direction and rotating the optical element around one axis or around two independent axes.

18. A positionable part and/or a base part suitable for an apparatus according to claim 1.

19. An apparatus according to claim 1, wherein each of said one or more magnets is mounted essentially longitudinally next to each of said electrically conductive coils of said actuation element to which the magnet belongs.

20. An apparatus according to claim 19, further comprising a proximity or a distance sensor located longitudinally next to one of said at least one electrically conductive coil comprising a static coil mounted on top of the magnet of the actuation element to which said at least one electrically conductive coil belongs.

21. An apparatus according to claim 5, wherein each of said leaf springs is essentially flat and essentially extends along said common geometric plane.

* * * * *